United States Patent
Qingkun

(10) Patent No.: US 11,177,754 B2
(45) Date of Patent: Nov. 16, 2021

(54) HIGHLY ENERGY EFFICIENT CIRCUIT FOR AN AC CEILING FAN MOTOR IN HIGH SPEED GEAR

(71) Applicant: ZHONGSHAN SANFAN ELECTRICAL APPLIANCE CO., LTD., Zhongshan (CN)

(72) Inventor: Guo Qingkun, Zhongshan (CN)

(73) Assignee: Zhongshan Sanfan Electrical Appliance Co., Ltd., Zhongshan (CN)

( * ) Notice: Subject to any disclaimer, the term of this patent is extended or adjusted under 35 U.S.C. 154(b) by 33 days.

(21) Appl. No.: 16/792,724

(22) Filed: Feb. 17, 2020

(65) Prior Publication Data

US 2021/0021223 A1 Jan. 21, 2021

(51) Int. Cl.
| | |
|---|---|
| H02P 23/24 | (2016.01) |
| H02P 23/18 | (2016.01) |
| F04D 25/06 | (2006.01) |
| F04D 25/08 | (2006.01) |
| H02P 1/44 | (2006.01) |
| H02P 25/04 | (2006.01) |

(52) U.S. Cl.
CPC ............ H02P 23/183 (2016.02); F04D 25/06 (2013.01); F04D 25/088 (2013.01); H02P 1/44 (2013.01); H02P 23/24 (2016.02); H02P 25/04 (2013.01)

(58) Field of Classification Search
CPC ........ H02P 23/183; H02P 25/18; H02P 23/24; H02P 1/44; H02P 25/04; F04D 25/06; F04D 27/004; F04D 25/088
See application file for complete search history.

(56) References Cited

U.S. PATENT DOCUMENTS

| | | | | |
|---|---|---|---|---|
| 4,352,993 A * | 10/1982 | Hannas | ................... | H02P 25/24 307/112 |
| 4,762,463 A * | 8/1988 | Yang | ..................... | F04D 27/00 416/170 R |
| 4,992,709 A * | 2/1991 | Griffin | ..................... | H02P 25/04 318/249 |
| 5,300,871 A * | 4/1994 | Bucher | ..................... | H02P 1/44 318/778 |
| 6,570,778 B2 * | 5/2003 | Lipo | ......................... | H02P 1/44 318/807 |
| 6,921,874 B2 * | 7/2005 | Tseng | ..................... | H01H 17/22 200/543 |
| 8,193,744 B2 * | 6/2012 | Steiner | ..................... | H02P 1/24 318/249 |
| 2015/0097511 A1* | 4/2015 | Chang | ..................... | H02P 1/445 318/749 |

* cited by examiner

*Primary Examiner* — Rina I Duda
(74) *Attorney, Agent, or Firm* — Myers Bigel, P.A.

(57) ABSTRACT

A highly energy efficient circuit for an AC ceiling fan motor in high speed gear, which comprises a speed regulator and a ceiling fan motor whose output torque at full voltage exceeds a required torque at rated load. Two ends of a winding of the ceiling fan motor are connected to a voltage-regulating capacitor bank and a zero line, respectively. The voltage-regulating capacitor bank comprises a first capacitor bank for enabling low speed operation of the ceiling fan motor by stepping down by a third capacitor, a second capacitor bank for enabling medium speed operation of the ceiling fan motor by stepping down by a second capacitor and the third capacitor in parallel, and a third capacitor bank for enabling high speed operation of the ceiling fan motor by stepping down by a first capacitor, the second capacitor and the third capacitor in parallel.

5 Claims, 2 Drawing Sheets

HIGHLY ENERGY EFFICIENT CIRCUIT FOR AN AC CEILING FAN MOTOR IN HIGH SPEED GEAR

STATEMENT OF PRIORITY

This application claims priority from and the benefit of Chinese Patent Application No. 2019106473143, filed on Jul. 17, 2019, the disclosure of which is hereby incorporated herein in its entirety.

FIELD OF THE INVENTION

The present application relates to a circuit for a ceiling fan, in particular to a highly energy efficient circuit for an AC ceiling fan motor in high speed gear.

BACKGROUND OF THE INVENTION

The principle of regulating voltage on a three-speed ceiling fan motor by stepping-down with a capacitor in prior art is shown in FIG. 1. It can be seen from this figure that the speed regulator is regulated to make the ceiling fan motor to be connected to the power supply directly to enable high speed operation of the ceiling fan motor with full-voltage, and the speed regulator is regulated to step down by a capacitor C1 and a capacitor C2 in parallel to enable medium speed operation of the ceiling fan motor, and the speed regulator is regulated to step down by a capacitor C2 to enable low speed operation of the ceiling fan motor, so that three-speed regulation to the ceiling fan motor is achieved. However, it can be seen from the working characteristic diagram of the ceiling fan motor in FIG. 2 that the smaller the input power of the ceiling fan motor, the higher the work efficiency. While in the conventional three-speed ceiling fan by stepping-down with a capacitor, the ceiling fan motor in high-speed gear runs at full voltage, so the output power and output torque of the fan motor are maximum, but the efficiency is the lowest.

SUMMARY OF THE INVENTION

In order to overcome the shortcomings of the prior art, the present invention provides a highly energy efficient circuit for an AC ceiling fan motor in high speed gear.

The technical solutions adopted by the present invention to solve its technical problems are:

The application provides a highly energy efficient circuit for an AC ceiling fan motor in high speed gear, which comprises a speed regulator and a ceiling fan motor whose output torque at full voltage exceeds a required torque at rated load, wherein two ends of a winding of the ceiling fan motor are connected to a voltage-regulating capacitor bank and a zero line, respectively, the voltage-regulating capacitor bank comprises a first capacitor bank for enabling low speed operation of the ceiling fan motor by stepping down by a capacitor C3, a second capacitor bank for enabling medium speed operation of the ceiling fan motor by stepping down by a capacitor C2 and the capacitor C3 in parallel, and a third capacitor bank for enabling high speed operation of the ceiling fan motor by stepping down by a capacitor C1, the capacitor C2 and the capacitor C3 in parallel to improve energy efficiency to enable the ceiling fan motor to operate efficiently, the speed regulator comprises a shift switch whose input end is connected to a live wire, the speed regulator adjusts the voltage of the ceiling fan motor by switching to the first capacitor bank, the second capacitor bank or the third capacitor bank through the shift switch.

In the present invention, the ceiling fan motor comprises a main winding and a secondary winding, and two ends of the main winding are respectively connected to the output end of the voltage-regulating capacitor bank and the zero line, and the secondary winding is connected in series with a starting capacitor, and the main winding and the main winding is connected in parallel with the series-connected secondary winding and the starting capacitor.

In the present invention, the highly energy efficient circuit for an AC ceiling fan motor in high speed gear further comprises a switching circuit for switching the running direction of the ceiling fan motor, the switching circuit is arranged after the main winding is connected in parallel with the series-connected secondary winding and the starting capacitor.

In the present invention, the shift switch comprises an upper shift pad, a lower shift pad, and a wire conducting the upper shift pad and the lower shift pad. The upper shift pad and the lower shift pad contact to achieve a low-speed switch that the first capacitor bank is switched into operation to output a stepped-down voltage, a medium-speed switch that the second capacitor bank is switched into operation to output a stepped-down voltage, and a high-speed switch that the third capacitor bank is switched into operation to output a stepped-down voltage.

In the present invention, wiring caps are provided where the speed regulator, the ceiling fan motor, the voltage-regulating capacitor bank, and the switching circuit are connected.

The beneficial effect of the present invention is that the connection of the voltage regulating capacitor bank is optimized, and according to the working characteristic diagram of the ceiling fan motor combined with the optimized voltage regulating capacitor bank, it is determined when the efficiency is highest when the ceiling fan motor is operating at low speed, medium speed, and high speed. Then increasing the size of the ceiling fan motor, so that the output torque at full voltage of the ceiling fan motor 2 exceeds a required torque at rated load, and provide a corresponding voltage through the third capacitor bank to drive the improved ceiling fan motor, which improves the working efficiency and performance of the ceiling fan motor, reduce the energy consumption required for the operation of the ceiling fan motor, which follows the trend of energy conservation and emission reduction, and is suitable for promotion and application.

DESCRIPTION OF DRAWINGS

The present invention will be further described in detail below with reference to the drawings and specific embodiments.

DETAILED DESCRIPTION OF THE INVENTION

In order to make the objectives, technical solutions, and advantages of the embodiments of the present invention clear, the technical solutions in the embodiments of the present invention will be described clearly and completely with reference to the drawings in the embodiments of the present invention.

Figure 1:
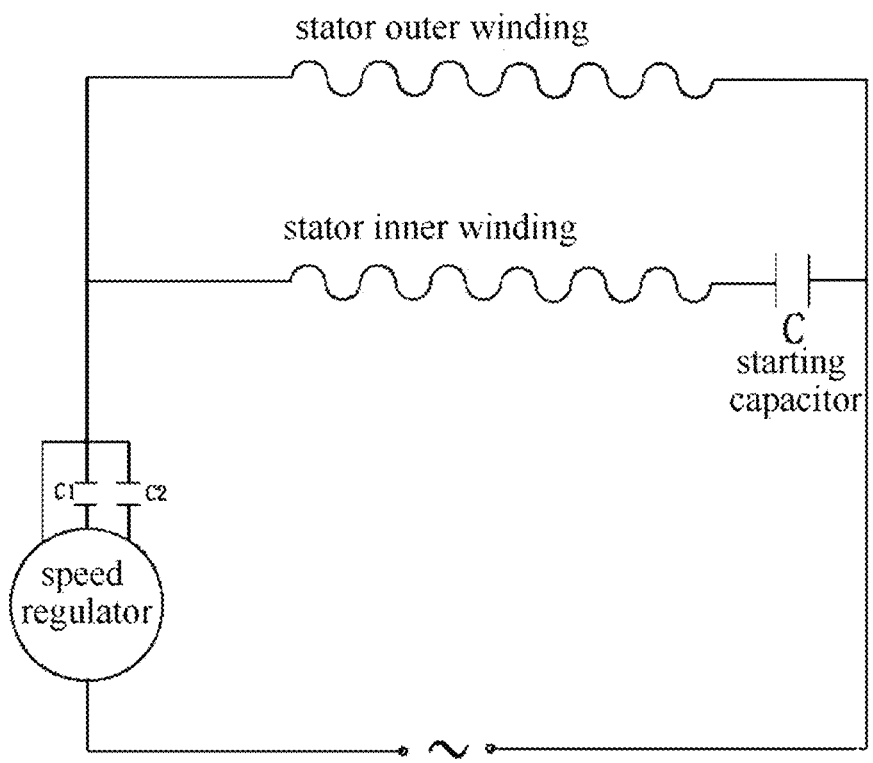
FIG. 1 is a schematic diagram about the voltage regulation of a three-speed ceiling fan motor.
Figure 2:
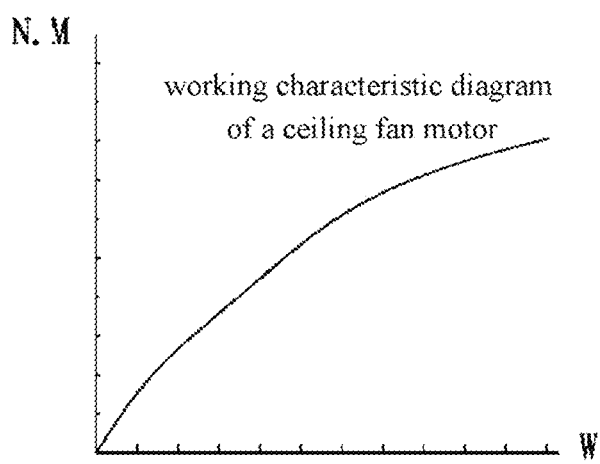
FIG. 2 is a working characteristic diagram of a ceiling fan motor.
Figure 3:
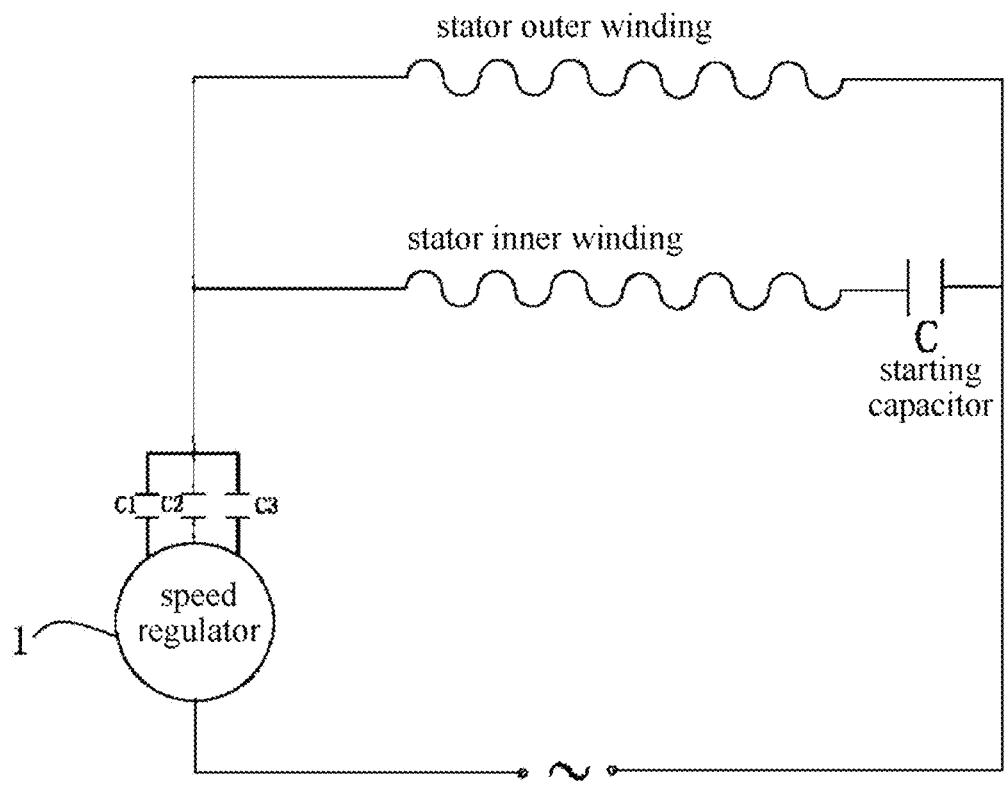
FIG. 3 is a schematic diagram about the voltage regulation of an embodiment of the present application.
Figure 4:
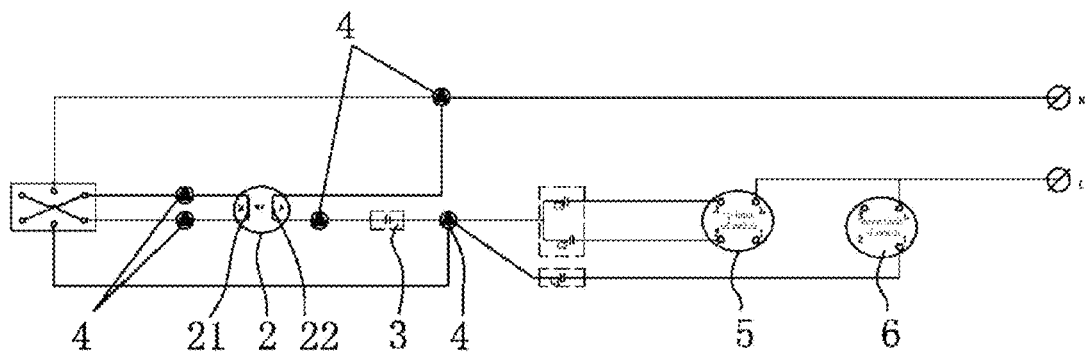
FIG. 4 is a circuit diagram of an embodiment of the present application.

Referring to FIGS. 3 and 4, a highly energy efficient circuit for an AC ceiling fan motor in high speed gear is provided, which comprises a speed regulator 1 and a ceiling fan motor 2 whose output torque at full voltage exceeds a required torque at rated load, wherein two ends of a winding of the ceiling fan motor 2 are connected to a voltage-regulating capacitor bank and a zero line. Further, the voltage-regulating capacitor bank comprises a first capacitor bank for enabling low speed operation of the ceiling fan motor 2 by stepping down by a capacitor C3, a second capacitor bank for enabling medium speed operation of the ceiling fan motor 2 by stepping down by a capacitor C2 and the capacitor C3 in parallel, and a third capacitor bank for enabling high speed operation of the ceiling fan motor 2 by stepping down by a capacitor C1, the capacitor C2 and the capacitor C3 in parallel to improve energy efficiency to enable the ceiling fan motor to operate efficiently in high speed gear. The speed regulator 1 comprises a shift switch whose input end is connected to a live wire, which speed regulator 1 adjusts the voltage of the ceiling fan motor 2 by switching to the first capacitor bank, the second capacitor bank or the third capacitor bank through the shift switch.

Referring to FIG. 3, the principle of the above circuit about how to step down and improve energy efficiency in high-speed gear is as follows: under a specific load, the ceiling fan motor 2 is made larger in volume, so that the output torque at full voltage of the ceiling fan motor 2 exceeds a required torque at rated load; and according to the output characteristic diagram of the ceiling fan motor 2, an output power and an input voltage corresponding to the rated load are obtained, so as to calculate a step-down capacitance output by the third capacitor bank in the high-speed gear, which is the sum of the capacitances of the capacitor C1, the capacitor C2, and the capacitor C3, and by which the voltage of the power supply is stepped down to drive the ceiling fan motor 2 to operate, thereby improving the working efficiency and performance of the ceiling fan motor 2.

Preferably, the ceiling fan motor 2 comprises a main winding 21 and a secondary winding 22, and two ends of the main winding 21 are respectively connected to an output end of the voltage-regulating capacitor bank and a zero line, and the secondary winding 22 is connected in series with a starting capacitor 3, and the main winding 21 is connected in parallel with the series-connected secondary winding 22 and the starting capacitor 3. The above-mentioned main winding 21 may also be referred to as a stator outer winding, the secondary winding 22 is referred to as a stator inner winding, and the output end of the voltage-regulating capacitor bank is one of the output ends of the first capacitor bank, the second capacitor bank and the third capacitor bank. Further, in one embodiment of the present application, a highly energy efficient circuit for an AC ceiling fan motor in high speed gear comprises a switching circuit for switching the running direction of the ceiling fan motor 2. The switching circuit is arranged after the main winding 21 is connected in parallel with the series-connected secondary winding 22 and the starting capacitor 3. The direction of the rotating magnetic field of the ceiling fan motor 2 is changed by the switching circuit to control the ceiling fan motor 2 to rotate in different directions.

Preferably, the shift switch comprises an upper shift pad 5, a lower shift pad 6, and a wire conducting the upper shift pad 5 and the lower shift pad 6. The upper shift pad 5 and the lower shift pad 6 contact to achieve a low-speed switch that the first capacitor bank is switched into operation to output a stepped-down voltage, a medium-speed switch that the second capacitor bank is switched into operation to output a stepped-down voltage, a high-speed switch that the third capacitor bank is switched into operation to output a stepped-down voltage and a shutdown switch that the circuit of ceiling fan motor 2 is cut off. Further, the upper shift pad 5 is marked with "L, 1, 2, 3", and the upper shift pad 5 is formed with the upper L end, the upper 1 end, the upper 2 end, and the upper 3 end; the lower shift pad 6 is also marked with "L, 1, 2, 3", and the lower shift pad 6 is formed with the lower L end, the lower 1 end, the lower 2 end, and the lower 3 end; the upper L end and the lower L end are both connected to the live wire, the upper 2 end is connected to the capacitor C2, the upper 3 end is connected to the capacitor C3, and the lower 1 end is connected to the capacitor C1. The conduction mode is shown in Table 1 below when the ceiling fan motor 2 is operated in low-speed gear, medium-speed gear and high-speed gear:

TABLE 1

| GEAR | WAY OF ON-SWITCH | |
|---|---|---|
| | UPPER SHIFT PAD | LOWER SHIFT PAD |
| LOW SPEED GEAR | L-2-3 | L-1 |
| MEDIUM SPEED GEAR | L-3-1 | L-2 |
| HIGH SPEED GEAR | L-1-2 | L-3 |
| CUT OFF SWITCH | OFF | OFF |

The upper L end and the lower L end are connected via wire.

Preferably, in the circuit formed by the speed regulator 1, the ceiling fan motor 2, and the switching circuit, wiring caps 4 are provided where the speed regulator 1, the ceiling fan motor 2, the voltage-regulating capacitor bank, and the switching circuit are connected to improve reliability of the connection, which avoids disconnection between wirings caused by the vibration of the ceiling fan motor 2, and effectively improves the service life and working stability of the present invention.

The above is only the preferred embodiment of the present invention, and is not intended to limit the present invention, and the technical solutions for achieving the object of the present invention by substantially the same means are all within the scope of the present invention.

That which is claimed:

1. A highly energy efficient circuit for an AC ceiling fan motor in high speed gear, comprising a speed regulator (1) and a ceiling fan motor (2) whose output torque at full voltage exceeds a required torque at rated load, wherein two ends of a winding of the ceiling fan motor (2) are connected to a voltage-regulating capacitor bank and a zero line, respectively, the voltage-regulating capacitor bank comprises a first capacitor bank for enabling low speed operation of the ceiling fan motor (2) by stepping down by a third capacitor (C3), a second capacitor bank for enabling medium speed operation of the ceiling fan motor (2) by stepping down by a second capacitor (C2) and the third capacitor (C3) in parallel, and a third capacitor bank for enabling high speed operation of the ceiling fan motor (2) by stepping down by a first capacitor (C1), the second capacitor (C2) and the third capacitor (C3) in parallel to improve energy efficiency to enable the ceiling fan motor to operate efficiently, the speed regulator (1) comprises a shift switch whose input end is connected to a live wire, the speed regulator (1) adjusts the voltage of the ceiling fan motor (2)

by switching to the first capacitor bank, the second capacitor bank or the third capacitor bank through the shift switch.

2. The highly energy efficient circuit for an AC ceiling fan motor in high speed gear according to claim 1, wherein the ceiling fan motor (2) comprises a main winding (21) and a secondary winding (22), two ends of the main winding (21) are respectively connected to an output end of the voltage-regulating capacitor bank and the zero line, the secondary winding (22) is connected in series with a starting capacitor (3), and the main winding (21) is connected in parallel with the series-connected secondary winding (22) and the starting capacitor (3).

3. The highly energy efficient circuit for an AC ceiling fan motor in high speed gear according to claim 2, further comprises a switching circuit for switching a running direction of the ceiling fan motor (2), the switching circuit is arranged after the main winding (21) is connected in parallel with the series-connected secondary winding (22) and the starting capacitor (3).

4. The highly energy efficient circuit for an AC ceiling fan motor in high speed gear according to claim 1, wherein the shift switch comprises an upper shift pad (5), a lower shift pad (6), and a wire conducting the upper shift pad (5) and the lower shift pad (6), the upper shift pad (5) and the lower shift pad (6) contact to achieve a low-speed switch that the first capacitor bank is switched into operation to output a first stepped-down voltage, a medium-speed switch that the second capacitor bank is switched into operation to output a second stepped-down voltage, and a high-speed switch that the third capacitor bank is switched into operation to output a third stepped-down voltage.

5. The highly energy efficient circuit for an AC ceiling fan motor in high speed gear according to claim 3, wherein wiring caps (4) are provided where the speed regulator (1), the ceiling fan motor (2), the voltage-regulating capacitor bank, and the switching circuit are connected.

* * * * *

UNITED STATES PATENT AND TRADEMARK OFFICE
CERTIFICATE OF CORRECTION

PATENT NO. : 11,177,754 B2  
APPLICATION NO. : 16/792724  
DATED : November 16, 2021  
INVENTOR(S) : Guo Qingkun Page 1 of 1

It is certified that error appears in the above-identified patent and that said Letters Patent is hereby corrected as shown below:

On the Title Page

(30) Foreign Application Priority Data: Please insert:  
-- July 17, 2019 (CN) 2019106473143 --

Signed and Sealed this  
Eighth Day of November, 2022

Katherine Kelly Vidal  
*Director of the United States Patent and Trademark Office*